United States Patent [19]

Siemionko

[11] 4,412,058
[45] Oct. 25, 1983

[54] AROMATIC POLYESTERS AND HIGH STRENGTH FILAMENTS THEREOF

[75] Inventor: Roger K. Siemionko, Newark, Del.

[73] Assignee: E. I. Du Pont de Nemours and Company, Wilmington, Del.

[21] Appl. No.: 464,428

[22] Filed: Feb. 7, 1983

Related U.S. Application Data

[63] Continuation-in-part of Ser. No. 384,343, Jun. 2, 1982.

[51] Int. Cl.³ .................... C08G 63/18; C08G 63/60
[52] U.S. Cl. .................................. 528/191; 528/176; 528/193; 528/194; 528/271
[58] Field of Search ............... 528/176, 190, 191, 193, 528/194, 271

[56] References Cited

U.S. PATENT DOCUMENTS

| | | | |
|---|---|---|---|
| 3,778,410 | 12/1973 | Kuhfuss et al. | 525/437 |
| 3,975,487 | 8/1976 | Cottis et al. | 264/210.6 |
| 4,118,372 | 10/1978 | Schaefgen | 528/191 |
| 4,146,702 | 3/1979 | Morris et al. | 528/191 |
| 4,183,895 | 1/1980 | Luise | 528/191 |
| 4,256,624 | 3/1981 | Calundann | 524/599 |
| 4,311,824 | 1/1982 | Fayolle | 528/191 |
| 4,346,208 | 8/1982 | Fayolle | 528/191 |

*Primary Examiner*—Lester L. Lee

[57] ABSTRACT

Filaments, films or moldings are prepared from meltable polyesters derived from chloro- or methylhydroquinone, terephthalic acid, a member of the group consisting of 4,4'-dihydroxybiphenyl, and 4-carboxy-4'-hydroxybiphenyl and a member of the group consisting of isophthalic acid, resorcinol and 1,3-hydroxybenzoic acid. As-spun filaments from these polymers can be heat treated while free from tension to increase their tenacity.

8 Claims, No Drawings

AROMATIC POLYESTERS AND HIGH STRENGTH FILAMENTS THEREOF

CROSS-REFERENCE TO RELATED APPLICATION

This application is a continuation-in-part of my co-pending Application Ser. No. 384,343, filed June 2, 1982.

BACKGROUND OF THE INVENTION

1. Field of the Invention

This invention pertains to aromatic polyesters capable of forming optically anisotropic melts, and to high strength/high modulus filaments, tough films and moldings thereof.

2. Description of the Prior Art

A class of aromatic polyesters that form optically anisotropic melts from which oriented filaments can be melt-spun has been described in Schaefgen U.S. Pat. No. 4,118,372. One polyester disclosed therein is poly(chloro-1,4-phenylene terephthalate/4,4'-bibenzoate) (70/30). Filaments are melt-spun from the polymer and then heat treated to increase tenacity.

Calundann U.S. Pat. No. 4,256,624 discloses a melt-processable aromatic polyester that is formed from moieties derived from para-oriented dihydric phenol, para-oriented aromatic dicarboxylic acid and 6-hydroxy-2-naphthoic acid. The moiety derived from 4,4'-dihydroxybiphenyl is taught therein as a suitable symmetrical dioxy aryl moiety. Cottis U.S. Pat. No. 3,975,487 discloses aromatic polyesters from hydroxybenzoic acid, 4,4'-dihydroxybiphenyl, terephthalic and isophthalic acids.

Kuhfuss, et al. U.S. Pat. No. 3,778,410, Col. 5, discloses p(p'-acetoxyphenyl)benzoic acid as a starting material in preparation of copolyesters.

SUMMARY OF THE INVENTION

The present invention is directed to polyesters consisting essentially of units having structural formulas as follows:

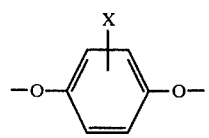  I.

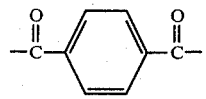  II.

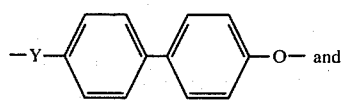  III.

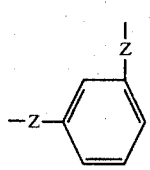  IV.

where X is chloro or methyl; Y is either carbonyl or oxy and each Z independently selected from the group consisting of oxy and carbonyl; unit I is present in the amount of from about 30 to 45 mol percent, unit II is present in the amount of from about 30 to 50 mol %, unit III is present in the amount of from about 5 to 20 mol percent and unit IV is present in the amount of from about 2 to 15 mol percent with the total dioxy aryl units and the total dicarbonyl aryl units being present in substantially equimolar amounts. Also encompassed by this invention are filaments, films and molded articles from such polymers.

DETAILED DESCRIPTION OF THE INVENTION

In the following discussion directions are given for selecting the precursors of each of the required structural units. It should be understood that the precursors may be used in equivalent forms. For example the dihydric phenols may be used in the form of the diacetates. Dicarboxylic acids may be used as the dimethyl or diphenyl esters. The hydroxy carboxy aromatics may be used as the acetoxy carboxy aromatics.

The polyesters of the present invention consist essentially of

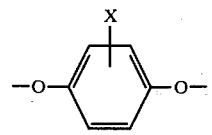  I.

units which may be derived from chloro- or methylhydroquinone but are preferably from chlorohydroquinone;

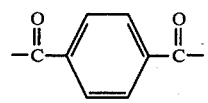  II.

units may be derived from terephthalic acid;

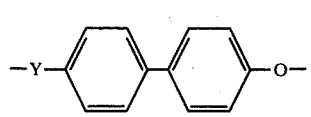  III.

units where Y is —O— or

(preferably —O—) and which may be derived from 4,4'-dihydroxybiphenyl or 4-carboxy-4'-hydroxybiphenyl, respectively, and

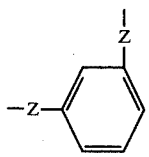  IV.

units where both Z's are —O—, both Z's are

or one Z is —O— and one Z is

and which may be derived from resorcinol, isophthalic acid or 3-hydroxybenzoic acid.

The total units derived from dihydric phenols should be substantially equivalent to the total units derived from aromatic dicarboxylic acids.

In the polyesters of the invention, unit I is present in the amount of from about 30 to 45 mol %, preferably from about 35 to 45 mol %. Unit II is present in the amount of from about 30 to 50 mol %, preferably from about 35 to 50 mol %. Unit III is present in the amount of from about 5 to 20 mol %, preferably from about 5 to 15 mol % while unit IV is present in the amount of from about 2 to 15 mol %, preferably from about 3 to 15 mol %.

When unit IV is 1,3 dioxyphenylene and unit III is 4,4'-dioxybiphenylene, it is preferred to employ at least about 5 mol % and more preferably at least about 10 mol % of unit IV. On the other hand, when unit IV is isophthaloyl or 3-oxybenzoyl, smaller amounts of unit IV can be used to advantage. The most preferred polyesters of this invention consist essentially of the following units in the indicated ranges:

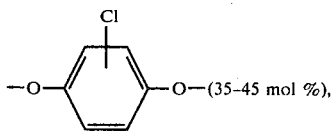

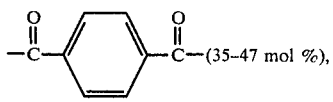

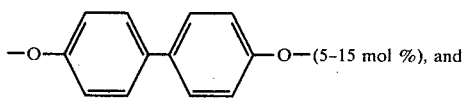

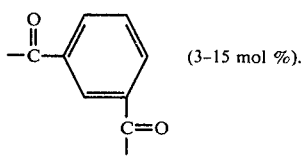

The polyesters of the invention are capable of forming optically anisotropic melts as defined in Schaefgen U.S. Pat. No. 4,118,372 and have a molecular weight sufficient for melt-spinning into filaments or preparation of tough films.

POLYMERIZATION CONDITIONS

The polyesters of the invention may be prepared by standard melt polymerization techniques from the reactant precursors in such proportions to provide the proportions of moieties substantially as described above. Details of the procedure are found in the examples below. In general, a mixture of monomers is heated with stirring, under nitrogen in a 250 ml 3-necked flask or polymerization tube in a Wood's metal bath or other suitable heating medium from approximately 250° C. to 330°–380° C. Polymerization is continued for up to a total of 0.5 to one hour or longer if necessary until a polymer of fiber-forming molecular weight is obtained. Usually a vacuum is applied to obtain a final product with high molecular weight.

FILAMENT PREPARATION

The polyesters of the invention are spun into filaments by conventional melt-spinning techniques without substantial degradation. In the examples below, filaments were prepared by melt-spinning into a quenching atmosphere of air or nitrogen and collected at a windup speed specified in the example. Melt pumping speed is adjusted to give the approximate linear density (D) in tex units as shown in the tables at the stated windup speeds.

As used herein, the term "as-spun" filament refers to a filament which has not been drawn or heat treated after extrusion and normal windup.

HEAT TREATMENT AND UTILITY

The as-spun filaments of this invention may be subjected to heat treatment in an oven while relaxed to provide high strength filaments useful for a variety of industrial applications such as plastic and rubber reinforcement. In the heat-treating process, loosely collected filaments (on soft, yielding bobbins, as skeins, as piddled packages, etc.) are usually heated in an inert atmosphere that is continuously purged by flow of inert gas through the oven to remove by-products from the vicinity of the filament as taught in Luise U.S. Pat. No. 4,183,895. Temperatures approaching the fusion point but sufficiently below to prevent interfilament fusion are employed. Preferably the maximum temperature is reached in a stepwise fashion.

The polymers of the invention are also useful for the production of tough films and molded articles.

MEASUREMENTS AND TESTS

Inherent viscosity ($n_{inh}$) was computed from $n_{inh} = \ln n_{rel}/C$
where $n_{rel}$ is the relative viscosity and C is the solution concentration in grams of polymer per deciliter of solvent. Relative viscosity is the ratio of polymer solution flow time to solvent flow time in a capillary viscometer at 30° C. The solvent is p-chlorophenol or pentafluorophenol as indicated in the examples. Although the supercooled solution in pentafluorophenol gave accurate results, values were checked at higher temperatures, i.e., 45° C., where indicated.

The polymers were characterized by stick temperature meaning the temperature of a thermal-gradient hot bar at the point at which the polymer first began to stick as it was pressed to the bar at progressively higher temperatures.

Monofilament tensile properties were measured using a recording stress-strain analyzer at 70° F. (21.1° C.) and 65% relative humidity. Gauge length was 1.0 in (2.54 cm), and rate of elongation was 10%/min. Results are reported as follows: linear density in tex units, tenacity (at break) in dN/tex, elongation (at break) is the percentage by which initial length increased, and modulus (initial tensile) in dN/tex. Average tensile properties for three to five filament samples are reported. Fibers of this invention have high initial moduli (i.e., above 200 dN/tex) and high tenacity (above 10 dN/tex) after heat-treatment.

Tensile properties for multifilament yarns were also measured with a recording stress-strain analyzer at 21° C. and 65% relative humidity using 3 turns-per-inch twist and a gauge length of 10 in (25.4 cm). Average tensile properties for at least three specimens are reported.

Tensile properties of molded polymers were determined by ASTM Method D638-76 on injection molded specimens with a narrow neck section. The specimens are prepared by injection molding from a one-ounce (28 g) ram machine at a barrel temperature of about 290° to 330° C., depending on polymer composition. The ram pressure is 300 to 400 lbs/in² (2.1–2.8 MPa). A cycle of 20 sec. to charge and 20 sec. to release and remove is used. Extrusion is made into a V-block cavity microtensile bar mold (unheated) to give specimens with a neck cross-section of 0.125×0.0625 inch (0.318×0.159 cm).

Flexural properties of molded polymers were determined by ASTM Method D790-71 on injection molded bars 5 inches×0.5 inch×0.0625 inch (12.7×1.27×0.159 cm). The bars were prepared by the method used for tensile specimens but with a suitable mold.

Notched Izod impact resistance of molded polymers was determined by ASTM Method D256-81 on 0.125 inch (0.318 cm) thick injection molded bars, prepared by the method used for flexural bar samples.

In each of the molded polymer tests, values given are averages of two or more measurements.

EXAMPLES

The results reported below are believed to be representative and do not constitute all the runs involving the indicated reactants.

In the examples, derivatives of the dihydric phenols and the hydroxyaromatic acids were generally used. Isophthalic acid and terephthalic acid were used as such rather than as esters or other derivatives.

The following code is employed to identify the repeat units provided by the listed reactants.

| Code | Unit | Reactant |
|------|------|----------|
| CHQ | chloro-1,4-dioxyphenylene | chlorohydroquinone |
| BPG | 4,4'- dioxybiphenylene | dihydroxybiphenyl |
| TA | terephthaloyl | terephthalic acid |
| IA | isophthaloyl | isophthalic acid |
| RQ | 1,3-dioxyphenylene | resorcinol |
| BE | 3-oxybenzoyl | 1,3-hydroxybenzoic acid |
| BPE | 4-carbonyl-4'-oxybiphenyl | 4(4'-hydroxyphenyl)-benzoic acid |

The monomer ingredients were added in substantially the same molar ratios as desired in the final polymer except that an excess (usually up to 7%) of acetylated dihydric phenol was generally used. The resultant polymer is identified, for example, as CHQ/BPG/TA/IA (40/10/40/10) meaning a polymer containing 40 mole % of chloro-1,4-dioxyphenylene units (CHQ), 10 mole % of 4,4'-dioxybiphenylene units (BPG), 40 mole % of terephthaloyl units (TA), and 10 mole % of isophthaloyl units (IA).

The 3-necked flask or polymer tube was fitted with: (1) a glass stirrer extending through a pressure-tight resin bushing, (2) a nitrogen inlet, and (3) a short column leading to a water- or air-cooled condenser with a flask for collecting acetic acid by-product. An attachment for application of vacuum was provided at the end of the condenser. An electrically heated Wood's metal bath or a boiling liquid vapor bath mounted for vertical adjustment was used for heating. The reaction mixture was heated to increasing temperatures with stirring at atmospheric pressure under nitrogen purge until essentially all the acetic acid had evolved. Then, vacuum was applied and pressure was reduced gradually from atmospheric to less than 1 mm of mercury (133.3 Pa). Heating under vacuum at less than 1 mm mercury pressure was then continued until viscosity had increased to a level believed satisfactory for melt-spinning. The cooled and solidified polymer was comminuted, and a portion was molded into a cylindrical plug for melt spinning.

Polymerization in a larger vessel is described in Example 3.

EXAMPLE 1

Filaments from a Copolyester of CHQ, RQ, TA and BPE

A 3-necked flask equipped with a mechanical stirrer, nitrogen inlet and distillation tube was charged with the following ingredients:

9.78 g (0.0428 mole) chlorohydroquinone diacetate (7 mole % excess)

1.04 g (0.0054 mole) resorcinol diacetate (7 mole % excess)

7.47 g (0.0450 mole) terephthalic acid 2.56 g (0.0100 mole) 4-carboxy-4'-hydroxybiphenyl monoacetate to prepare a polymer with the composition CHQ/RQ/TA/BPE (40/5/45/10)

The flask with contents continuously purged with nitrogen was immersed in a bath at 230° C. and the temperature was raised to 320° C. in 58 minutes as acetic acid distilled out. The mixture was maintained at 320° C. for 29 minutes and then cooled with continued nitrogen flow.

The resulting polymer had a stick temperature of 280° C. and an inherent viscosity in p-chlorophenol of 1.99. The polymer was melt spun through a spinneret with a single orifice 0.23 mm in diameter and 0.69 mm long. The polymer melt temperature was 318°–328° C. and the spinneret temperature was 322°–332° C. during spinning. The resulting filament was wound up at 549 meters/minute.

The as-spun properties were:

| | |
|---|---|
| Tex | 0.90 |
| Tenacity, dN/tex | 4.5 |
| Elongation at break, % | 1.6 |
| Modulus, dN/tex | 279 |

A portion of the yarn was heat-treated relaxed in a nitrogen purged atmosphere as follows:
Room Temp. to 214° C., 1.5 hr.
242° C., 3 hr.
275° C., 1 hr.
294° C., 1 hr.
300° C., 11 hr.

The heat-treated properties:

| | |
|---|---|
| Tex | 0.89 |
| Tenacity, dN/tex | 20.9 |
| Elongation at break, % | 4.3 |

| | |
|---|---|
| -continued | |
| Modulus, dN/tex | 507. |

COMPARATIVE EXAMPLE 1A

Filaments from a Copolyester of CHQ, TA, and BPE

A copolyester similar to Example 1 but lacking the resorcinol diacetate (RQ) was prepared in a similar manner using the following:
 10.40 g (0.0455 mole) chlorohydroquinone diacetate, (7 mole % excess)
 7.06 g (0.0425 mole) terephthalic acid
 3.84 g (0.0150 mole) 4-carboxy-4'-hydroxybiphenyl monoacetate The resulting polymer was CHQ/TA/BPE (42.5/42.5/15). It was prepared by heating the mixture in a 3-necked flask as in Example 1. The flask was immersed in a bath at 230° C., then heated to 345° C. in 63 minutes. A partial vacuum was applied for 3 minutes as the temperature rose to 350° C. Finally a full vacuum (0.1 mm) was applied for 14 minutes at 350° to 355° C.

The resulting polymer had a stick temperature of 280° C. and an inherent viscosity in p-chlorophenol of 2.44. The polymer was melt spun as in Example 1. The polymer melt temperature was 323°-340° C. and the spinneret temperature 323°-330° C. The filament was wound up at 457 and at 549 meters/minutes. Filaments spun at 325°/323° (melt/spinneret) and wound up at 549 m/min were heat-treated under the same schedule as Example 1. Properties were as follows:

| | As spun | Heat Treated |
|---|---|---|
| Tex. | 0.80 | 0.79 |
| Tenacity, dN/tex | 4.3 | 8.6 |
| Elongation, % | 1.2 | 2.2 |
| Modulus, dN/tex | 329. | 393. |

It it believed that the heat treatment for Example 1 and 1a give the optimum tensile properties, with Example 1 being far superior. The polymer containing the fourth ingredient (resorcinol) had much higher tenacity and modulus.

EXAMPLE 2

Filaments from Copolyesters of CHQ, BPG, TA and IA

A copolyester having the composition CHQ/BPG/TA/IA (40/10/40/10) was prepared using the apparatus of Example 1. The following ingredients were charged to the 3-neck flask
 19.19 g (0,084 mole) chlorohydroquinone diacetate (5 mole % excess)
 5.67 g (0.021 mole) 4,4'-dihydroxybiphenyl diacetate (5 mole % excess)
 13.28 g (0.080 mole) terephthalic acid
 3.32 g (0.020 mole) isophthalic acid The flask was immersed in a bath at 270° C.; the bath temperature was raised to 347° C. in 48 minutes at atmospheric pressure as acetic acid distilled off. A vacuum was then applied as temperature was maintained at 347° to 352° C. for 17 minutes, the final pressure being 0.10 mm mercury. The resulting polymer had a stick temperature of 204° C. and inherent viscosity in pentafluorophenol of 2.85. Fibers could be drawn from the gradient bar at 310° C.

The polymer was spun from a spinneret having a single orifice 0.23 mm in diameter and 0.69 mm long. The spinneret temperature was 325° C. and the fiber was spun from a cell held at 316° C. with a windup speed of 549 meters/min. The resulting yarn was heat treated in a nitrogen-purged oven as follows:
 Room temperature to 200° C., 2 hrs.
 200°-250° C., 2 hrs.
 250°-290° C., 2 hrs.
 290°-309° C., 11 hrs.

Properties of the fibers as-spun and after heat-treatment were as follows:

| | As-Spun | Heat-Treated |
|---|---|---|
| Tex. | 0.52 | 0.65 |
| Tenacity, dN/tex | 4.4 | 20.1 |
| Elongation, at break, % | 1.3 | 4.3 |
| Initial modulus, dN/tex | 436. | 408. |

COMPARATIVE EXAMPLE 2A

Filaments from a Copolyester of CHQ, TA and BPG

A copolyester similar to Example 2, but lacking the isophthalic acid, was prepared with the following monomers:
 50.38 g (0.2205 mole) chlorohydroquinone diacetate (5% excess)
 49.80 g (0.300 mole) terephthalic acid
 25.52 g (0.0945 mole) 4,4'-dihydroxybiphenyl diacetate (5% excess)

The resulting polymer was CHQ/TA/BPG (35/50/15). It was prepared by heating the above mixture in a 3-necked flask as in Example 1. The flask was immersed in a bath at 269° C., then heated to 339° C. in 70 minutes. Reduced pressure of 0.5 to 1 mm mercury was then applied, and the bath temperature was held at 338°-339° C. for the next 35 minutes. After 1 minute at atmospheric pressure to test fiber-forming ability, the viscous, pasty mass was again evacuated to 1 mm mercury pressure, and heating was continued for an additional 14 minutes at 338°-339° C.

The resulting polymer was insoluble in pentafluorophenol at 45° C. and formed fibers when a melt on a hot bar at 355° C. was touched with a rod and the rod was withdrawn. It was melt spun through a 0.23 mm diameter hole at 348°-352° C. and wound up at 288 m/min.

The as-spun properties were:

| | |
|---|---|
| Tex | 2.74 |
| Tenacity, dN/tex | 1.4 |
| Elongation at break, % | 0.59 |
| Modulus, dN/tex | 229 |

The fiber was heat treated relaxed in a nitrogen purged atmosphere as follows:
 Room temp. to 200° C., 2.5 hr.
 200°-250° C., 2 hr.
 250°-300° C., 2 hr.
 300°-310° C., 12 hr.

The heat treated properties were:

| | |
|---|---|
| Tex | 2.66 |
| Tenacity, dN/tex | 5.7 |
| Elongation at break, % | 2.0 |
| Modulus, dN/tex | 322 |

This polymer was pressed into a film 0.002 to 0.003 inch (0.051–0.076 mm) thick at 330° C. at a pressure of 5,000 lbs/in² (34 MPa) for 3 minutes and cooled under pressure to 280° C. in about 10 minutes. The film was brittle, indicated by the fact that it could not be folded double and pressed firmly between fingers without cracking. A portion of the polymer was post polymerized at 220°–240° C. in vacuo with nitrogen purging for 24 hours. A pressed film of this heated polymer was brittle and weak. Further post-polymerization for an additional 66 hours gave a polymer which was pressed to a stiff but quite brittle film.

EXAMPLE 3

Larger Scale Preparation of Filaments from Polymer Having the Composition CHQ/BPG/TA/IA (40/10/40/10)

The polymer of Example 2 was prepared again on a larger scale. The reactor consisted of a 2-liter resin kettle fitted with a mechanical stirrer equipped with a torque meter, an argon inlet tube, and a distillation column and receiver. The following ingredients were charged:

507.7 g chlorohydroquinone diacetate (2.22 mole) (5 mole % excess)
150.0 g 4,4'-dihydroxybiphenyl diacetate (0.56 mole) (5 mole % excess)
351.3 g terephthalic acid (2.12 mole)
87.8 g isophthalic acid (0.53 mole)
10.0 ml acetic anhydride The system was thoroughly purged with argon; then the reaction vessel with continuous purging with argon was immersed in a bath and the reaction mass heated from 256° C. to 327° C. in 65 minutes at atmospheric pressure. During this time the acetic anhydride was refluxed for 20 minutes; then the excess was removed by distillation. Vacuum was then applied as the temperature was increased from 327° C. to 340° C. over 45 minutes, the final pressure being about 0.9 mm of mercury. The reactants were stirred during the polymerization process at 150 revolutions per minute, and a rise in torque of 0.7–1.2 lb.in. (0.08–0.14 Nm) was observed. A second polymerization was run in the same type kettle. The combined polymer when tested on a thermal gradient bar formed fibers at 315°–316° C. The inherent viscosity in pentafluorophenol was 2.2 at 45° C. The polymer was optically anisotropic in the thermooptical test of Schaefgen U.S. Pat. No. 4,118,372. The polymer flowed in this test at 299° C. Density was 1.453 g/cm³.

The polymer was melt-spun from a 10-hole spinneret wherein each orifice was 0.23 mm in diameter and 0.69 mm long. The spinneret temperature was 325° C., the cell temperature 315°–320° C. and the windup speed 457 meters/min. The yarn was heat-treated by piddling onto perforated steel trays covered with a ceramic fibrous batting (Fiberfrax ® from Carborundum) and heating in a nitrogen-purged atmosphere according to the following schedule:

Room temperature to 200° C., 3 hrs.
200° to 300° C., 6 hrs.
300° C., 8.5 hrs.
300° C. to room temperature, 4.5 hrs.

The fiber properties before and after heat-treatment were:

|  | As-spun | Heat-treated |
|---|---|---|
| Tex (10 filaments) | 6.2 | 6.2 |
| Tenacity, dN/tex | 5.4 | 23.6 |
| Elongation, at break, % | 1.5 | 3.9 |
| Initial modulus, dN/tex | 452. | 459. |

Injection molded test specimens of the same polymer composition ($n_{inh}$ 2.8 in pentafluorophenol) were prepared at 330° C. with 300 to 400 lbs/in² gauge pressure (2.1 to 2.8 MPa) with dimensions as described in the test methods.

| ASTM Term | English units | Metric units |
|---|---|---|
| Tensile | | |
| Strength | 27.2 × 10³ lb/in² | 188 MPa |
| Elongation | 1.5% | 1.5% |
| Modulus (initial) | 3.0 × 10⁶ lb/in² | 21 GPa |
| Flexural | | |
| Strength (ultimate) | 16.7 × 10³ lb/in² | 115 MPa |
| Elongation (ultimate) | 4.1% | 4.1% |
| Modulus (initial) | 1.80 × 10⁶ lb/in² | 12.4 GPa |
| Strength (yield) | 21.1 × 10³ lb/in² | 145 MPa |
| Elongation (yield) | 2.2% | 2.2% |
| Impact Resistance | 4.55 ft.lb./in. (one sample) | 243 J./m |

Another batch of mixed polymer having the same composition, but having average $n_{inh}$ in pentafluorophenol of 3.5, was pressed into a film as in Example 2A. A tough film was formed. It could be folded double and pressed firmly between the fingers without cracking. Still tougher films were prepared by further polymerization of the polymer at 240° C. under vacuum with nitrogen purging for 48 hours.

EXAMPLE 4

Filaments from a Copolymer of CHQ, BPG, RQ, and TA

A polymer having the composition CHQ/BPG/RQ/TA (37.3/7.4/5.4/50.) was prepared using the equipment of Example 1 with the following ingredients:

8.56 g chlorohydroquinone diacetate (0.0374 moles)
2.00 g 4,4'-dihydroxybiphenyl diacetate (0.0074 moles)
1.04 g resorcinol diacetate (0.0054 moles)
8.31 g terephthalic acid (0.0500 moles)

The reaction flask was immersed in a heating bath at 250° C. and was heated to 350° C. in the course of 30 minutes. The temperature was maintained at 350° C. for 20 min at atmospheric pressure with distillation of acetic acid. Reduced pressure (down to 0.1 to 0.4 mm mercury) was applied and heating was continued at 346° to 350° C. for 20 minutes. Atmospheric pressure was applied for two 1 min intervals during this 20 minute period to show that fiber formation was possible. The resulting polymer had a stick temperature of 286° C.

The polymer was melt spun through a single spinneret orifice 0.23 mm in diameter. The spinneret temperature was 334° C., the cell temperature 336° C. and the windup speed 549 meters/min. Filaments were heat treated in relaxed conditions under nitrogen as follows:

Room temperature to 200° C., 2 hrs.
200°–304° C., 7 hrs.
304° C., 7 hrs.

| Properties of the filaments: | As-spun | Heat-treated |
| --- | --- | --- |
| Tex | 0.83 | 0.78 |
| Tenacity, dN/tex | 3.5 | 14.1 |
| Elongation, at break | 1.0 | 3.6 |
| Initial Modulus | 416. | 404. |

EXAMPLE 5

Molded bars from a Copolyester of CHQ, BPG, RQ and TA

A polymer having the composition CHQ/BPG/RQ/TA (30/10/10/50) was prepared with the equipment of Example 3 with the following ingredients:

241.32 g (1.67 moles) chlorohydroquinone (5% excess)

104.16 g (0.56 mole) 4,4'-dihydroxybiphenyl (5% excess)

108.64 g (0.56 mole) resorcinol diacetate (5% excess)

439.90 g (2.65 moles) terephthalic acid 525 g Acetic anhydride 0.6 g Sodium acetate The first two diols were acetylated in situ by the following procedure:

The reaction flask with contents continuously purged with argon was immersed in a heating bath with bath temperature at 269° C., then heated to 321° C. in 80 minutes. In the first 10 minutes the mixture was refluxed, and acetic anhydride distilled out. Then an additional 180 ml. acetic anhydride was added to compensate for distilled anhydride. Thereafter the mixture was refluxed for 35 minutes to acetylate the diols. Then in the next 35 minutes, excess acetic anhydride and acetic acid were distilled off.

To promote further polymerization the pressure was then reduced gradually to 5 mm mercury and the temperature raised to 338° C. This required 33 minutes. After 4 more minutes at about 338° C. and 5 mm pressure, the contents of the flask were cooled under a nitrogen atmosphere. The polymer inherent viscosity was 2.3 in pentafluorophenol at 45° C.

Injection molded test bars were prepared with a barrel temperature of about 290° C. with bar dimensions as described in the test methods. Properties of the molded bars were as follows:

| ASTM term | English units | Metric units |
| --- | --- | --- |
| Tensile | | |
| Strength | 38.1 × 10³ lb/in² | 263 MPa |
| Elongation | 2.65% | 2.65% |
| Modulus (initial) | 2.76 × 10⁶ lb/in² | 19.0 GPa |
| Flexural | | |
| Strength (ultimate) | 22.1 × 10³ lb/in² | 152 MPa |
| Elongation (ultimate) | 5.2% | 5.2% |
| Modulus (initial) | 2.27 × 10⁶ lb/in² | 15.6 GPa |
| Strength (yield) | 27.0 × 10³ lb/in² | 186 MPa |
| Elongation (yield) | 2.6% | 2.6% |

EXAMPLE 6

Filaments from Copolyesters of CHQ, BPG, TA and IA

A copolyester having the composition CHQ/BPG/TA/IA (40/10/47/3) was prepared using the apparatus of Example 1. The following ingredients were charged to the 3-neck flask 57.58 g (0.252 mole) chlorohydroquinone diacetate (5 mole % excess)

17.01 g (0.063 mole) 4,4'-dihydroxybiphenyl diacetate (5 mole % excess)

46.81 g (0.282 mole) terephthalic acid 2.99 g (0.018 mole) isophthalic acid

The flask was immersed in a bath at 270° C.; the bath temperature was raised to 340° C. in 50 minutes at atmospheric pressure as acetic acid distilled off. A vacuum was then applied as temperature was maintained at 337° to 340° C. for 17 minutes, the final pressure being 0.25 mm mercury. The resulting polymer had a stick temperature of 270° C. and inherent viscosity in pentafluorophenol of 2.17. Fibers could be drawn from the gradient bar at 320° C.

The polymer was spun from a 10-hole spinneret wherein each orifice was 0.23 mm in diameter and 0.69 mm long. The spinneret temperature was 329° C. and the fiber was spun from a cell held at 316°–325° C. with a windup speed of 457 meters/min. The resulting yarn was heat treated in a nitrogen-purged oven as follows:

Room temperature to 200° C., 2 hrs.

200–306° C., 6 hrs.

306°–308° C., 8½ hrs.

Properties of the yarns as-spun and after heat-treatment were as follows:

| | As-Spun | Heat-Treated |
| --- | --- | --- |
| Tex. (10 filament yarns) | 5.5 | 5.6 |
| Tenacity, dN/tex | 3.5 | 19.7 |
| Elongation, at break, % | 0.8 | 2.7 |
| Initial Modulus, dN/tex | 462 | 637 |

EXAMPLE 7

Filaments from Copolyesters of CHQ, BPG, BE and TA

A copolyester having the composition CHQ/BPG/BE/TA (36.8/10.5/5.3/47.4) was prepared using the apparatus of Example 1. The following ingredients were charged to the 3-neck flask 16.79 g (0.0735 mole) chlorohydroquinone diacetate (5 mole % excess)

5.67 g (0.0210 mole) 4,4'-dihydroxybiphenyl diacetate (5 mole % excess)

1.80 g (0.010 mole) 3-hydroxybenzoic acid, monoacetate 14.94 g (0.090 mole) terephthalic acid The flask was immersed in a bath at 275° C.; the bath temperature was raised to 339° C. in 61 minutes at atmospheric pressure as acetic acid distilled off. A vacuum was then applied as temperature was maintained at 339° to 340° C. for 14 minutes, the final pressure being 0.15 mm mercury. The resulting polymer had a stick temperature of 260° C. and inherent viscosity in pentafluorophenol of 1.77. Fibers could be drawn from the gradient bar at 312° C.

The polymer was spun from a spinneret having a single orifice 0.23 mm in diameter and 0.69 mm long. The spinneret temperature was 315° C. and the fiber was spun from a cell held at 305° C. with a windup speed of 549 meters/min. The resulting fibers were heat treated in a nitrogen-purged oven as follows:

Room temperature to 200° C., 2 hrs.

200°–250° C., 2 hrs.

250°-300° C., 2 hrs.
300°-305° C., 12 hrs.

Properties of the fibers as-spun and after heat-treatment were as follows:

|  | As-Spun | Heat-Treated |
|---|---|---|
| Tex | 0.88 | 0.82 |
| Tenacity, dN/tex | 3.9 | 16.6 |
| Elongation, at break, % | 1.3 | 4.1 |
| Initial Modulus, dN/tex | 388 | 418 |

EXAMPLE 8

Filaments from a Copolymer of CHQ, BPG, RQ and TA

A polymer having the composition CHQ/BPG/RQ/TA (30/5/15/50) was prepared using the equipment of Example 1 with the following ingredients:

43.2 g chlorohydroquinone diacetate (0.189 moles) (5 mole % excess)

8.52 g 4,4'-dihydroxybiphenyl diacetate (0.0315 moles) (5 mole % excess (18.33 g resorcinol diacetate (0.0945 moles) (5 mole % excess)

49.80 g terephthalic acid (0.300 moles)

The reaction flask was immersed in a heating bath at 280° C. and was heated to 340° C. in the course of 57 minutes at atmospheric pressure with distillation of acetic acid. Reduced pressure (down to 0.1 to 0.6 mm mercury) was applied and heating was continued at 335° to 340° C. for 28 minutes.

The resulting polymer had a stick temperature of 250° C. and inherent viscosity in pentafluorophenol of 1.02 at 45° C. Fibers could be drawn from the gradient bar at 304° C.

The polymer was melt spun through a 10-hole spinneret wherein each orifice was 0.23 mm in diameter and 0.69 mm long. The spinneret temperature was 297° C., the cell temperature 296°-307° C., and the windup speed 457 meters/min. The yarns were heat treated in a relaxed condition under nitrogen as follows:

Room temperature to 200° C., 2 hrs.
200°-300° C., 3 hrs.
300° C., 10½ hrs.

| Properties of the Yarns: | As-Spun | Heat-Treated |
|---|---|---|
| Tex (10 filament yarn) | 6.2 | 5.9 |
| Tenacity, dN/tex | 2.5 | 17.8 |
| Elongation, at break, % | 1.2 | 5.8 |
| Initial Modulus, dN/tex | 256 | 257 |

I claim:

1. A polyester consisting essentially of units having structural formulas as follows:

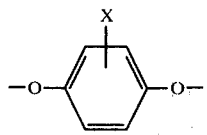 I.

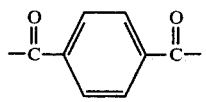 II.

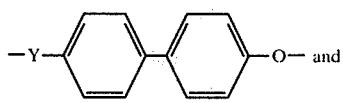 III.

and

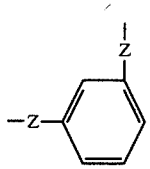 IV.

where X is chloro or methyl; Y is either carbonyl or oxy and each Z is independently selected from the group consisting of oxy and carbonyl; unit I is present in the amount of from about 30 to 45 mol percent, unit II is present in the amount of from about 30 to 50 mol %, unit III is present in the amount of from about 5 to 20 mol percent and unit IV is present in the amount of from about 2 to 15 mol percent with the total dioxy aryl units and the total dicarbonyl aryl units being present in substantially equimolar amounts.

2. A polyester according to claim 1 wherein unit I is present in the amount of from about 35-45 mol %, unit II is present in the amount of from about 35-50 mol %, unit III is present in the amount of from about 5 to 15 mol % and unit IV is present in the amount of from about 3 to 15 mol %.

3. A polyester according to claim 1 where X is chloro, Y is oxy and Z is oxy.

4. A polyester according to claim 1 where X is chloro, Y is oxy and Z is carbonyl.

5. A polyester according to claim 1 where X is chloro, Y is carbonyl and Z is oxy.

6. A filament of the polymer of claim 1.

7. A film of the polymer of claim 1.

8. A molded article of the polyester of claim 1.

* * * * *